US007630639B2

(12) United States Patent
Kramer et al.

(10) Patent No.: US 7,630,639 B2
(45) Date of Patent: Dec. 8, 2009

(54) METHOD AND APPARATUS FOR TRANSMISSION CONTROL IN AN ETHERNET PASSIVE OPTICAL NETWORK

(75) Inventors: Glen Kramer, Petaluma, CA (US); Edward W. Boyd, Petaluma, CA (US)

(73) Assignee: Teknovus, Inc., Petaluma, CA (US)

( * ) Notice: Subject to any disclaimer, the term of this patent is extended or adjusted under 35 U.S.C. 154(b) by 567 days.

(21) Appl. No.: 10/941,356

(22) Filed: Sep. 14, 2004

(65) Prior Publication Data

US 2005/0058452 A1 Mar. 17, 2005

Related U.S. Application Data

(60) Provisional application No. 60/502,856, filed on Sep. 15, 2003, provisional application No. 60/504,936, filed on Sep. 23, 2003.

(51) Int. Cl.
*H04B 10/00* (2006.01)
*H04B 10/08* (2006.01)
*H04J 14/00* (2006.01)

(52) U.S. Cl. .............................. 398/72; 398/31; 398/67; 398/74; 398/168

(58) Field of Classification Search ............. 398/30–33, 398/66–68, 70–72, 74, 75, 151, 153, 161, 398/168
See application file for complete search history.

(56) References Cited

U.S. PATENT DOCUMENTS 7,245,628 B2 * 7/2007 Shi et al. .................... 370/437

| | | | |
|---|---|---|---|
| 2002/0080444 A1 * | 6/2002 | Phillips et al. | 359/125 |
| 2003/0137975 A1 * | 7/2003 | Song et al. | 370/353 |
| 2003/0142693 A1 * | 7/2003 | Umayabashi et al. | 370/476 |
| 2004/0109688 A1 * | 6/2004 | Kim et al. | 398/68 |
| 2005/0249498 A1 * | 11/2005 | Haran et al. | 398/58 |

FOREIGN PATENT DOCUMENTS

| EP | 0765045 A1 | 3/1997 |
|---|---|---|
| EP | 1091525 A2 | 4/2001 |
| EP | 1333612 A2 | 8/2003 |

OTHER PUBLICATIONS

Publication: "Ethernet Passive Optical Network (EPON): Building a Next-Generation Optical Access Network" by Glen Kramer and Gerry Pesavento, IEEE Communications Magazine, IEEE Service Center, Piscataway, NJ, vol. 40, No. 2, Feb. 2002, pp. 66-73, XP001125420, ISSN: 0163-6804, p. 71, left-hand column, line 40, right-hand column, line 8.

* cited by examiner

*Primary Examiner*—Dalzid Singh
(74) *Attorney, Agent, or Firm*—Park, Vaughan & Fleming LLP; Shun Yao (57) ABSTRACT

One embodiment of the present invention provides a system that facilitates transmission control in an Ethernet passive optical network, which includes a central node and at least one remote node, and wherein a remote node implements a data-link layer and a physical layer. During operation, the system starts by receiving, at the physical layer of a remote node, a word which is communicated from the data-link layer of the remote node, wherein the word may be a data word or an idle word. The system then delays the word for a pre-determined amount of time before allowing the word to be transmitted by a transmitter, thereby providing time for turning the transmitter on or off. The system also turns the transmitter on or off based on the content of the received words.

21 Claims, 9 Drawing Sheets

METHOD AND APPARATUS FOR TRANSMISSION CONTROL IN AN ETHERNET PASSIVE OPTICAL NETWORK

RELATED APPLICATION

This application hereby claims priority under 35 U.S.C. §119 to the following provisional patent applications: U.S. Provisional Patent Application No. 60/502,856 filed on 15 Sep. 2003, entitled "Method for Laser Control in Ethernet Passive Optical Networks," by inventors Edward W. Boyd and Glen Kramer, and U.S. Provisional Patent Application No. 60/504,936 filed on 23 Sep. 2003, entitled "Method and Apparatus for Transmission Control in Ethernet Passive Optical Networks," by inventor Glen Kramer.

BACKGROUND

1. Field of the Invention

The present invention relates to the design of Ethernet passive optical networks. More specifically, the present invention relates to a method and an apparatus for controlling transmission to reduce interference caused by laser noise from different nodes in an Ethernet passive optical network.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies that are presently being developed, Ethernet passive optical networks (EPONs) are one of the best candidates for next-generation access networks. EPONs combine ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and, consequently, require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Figure 2:
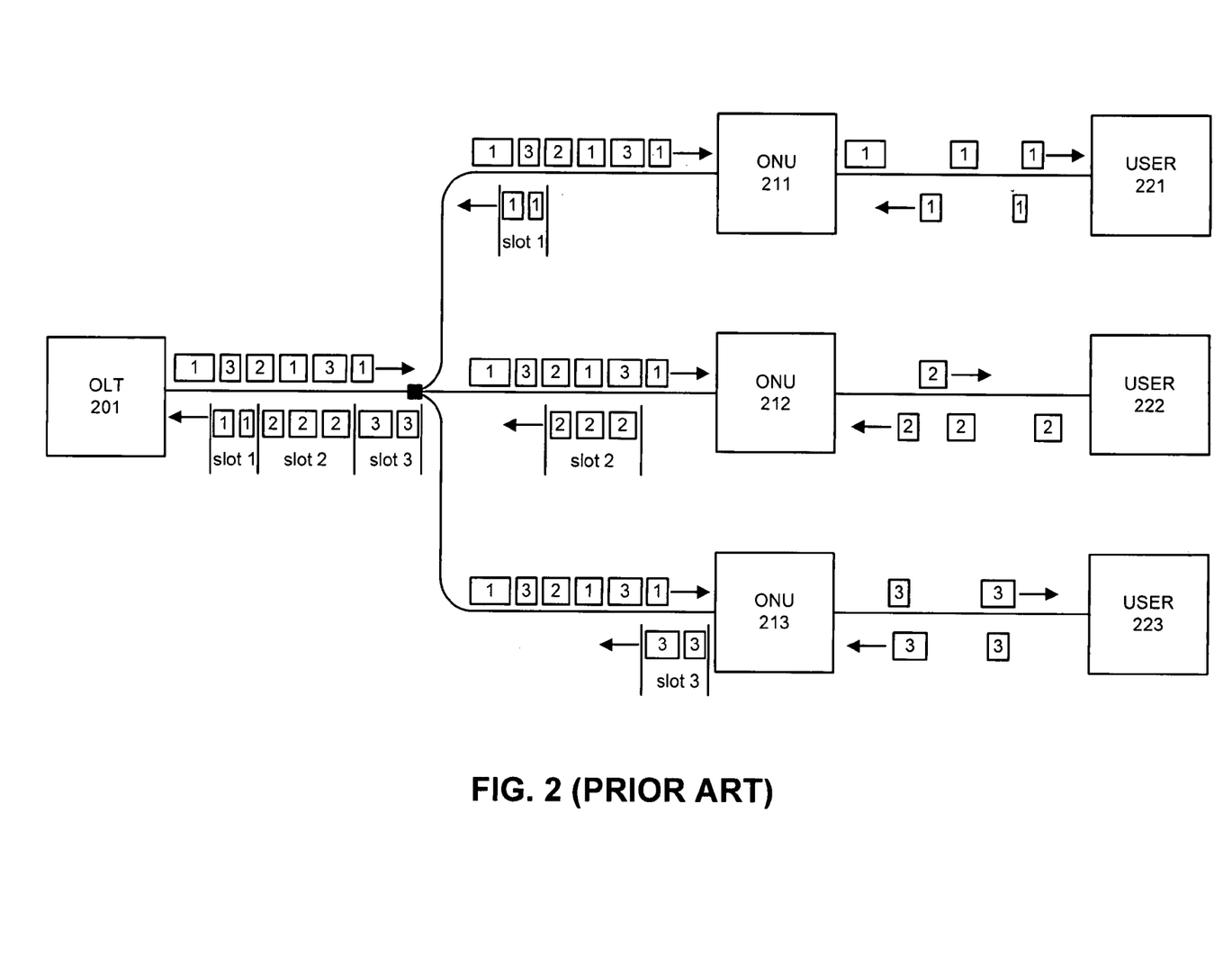
FIG. 2 illustrates an EPON in normal operation mode (prior art).

Transmissions within an EPON are typically performed between an optical line terminal (OLT) and optical networks units (ONUs) (see FIG. 2). The OLT generally resides in the central office and couples the optical access network to a metro backbone, which is typically an external network belonging to an Internet Service Provider (ISP) or a local exchange carrier. An ONU can be located either at the curb or at an end-user location, and can provide broadband voice, data, and video services. ONUs are typically coupled to a one-by-N (1×N) passive optical coupler, where N is the number of ONUs, and the passive optical coupler is typically coupled to the OLT through a single optical link. (Note that one may cascade a number of optical splitters/couplers to accommodate more ONUs.) This configuration can significantly save the number of fibers and the amount of hardware required by EPONs.

Communications within an EPON can be divided into downstream traffic (from OLT to ONUs) and upstream traffic (from ONUs to OLT). In the downstream direction, because of the broadcast nature of the 1×N passive optical coupler, downstream data frames are broadcast by the OLT to all ONUs and are subsequently extracted by their destination ONUs. In the upstream direction, the ONUs need to share channel capacity and resources, because there is only one link coupling the passive optical coupler with the OLT.

Correspondingly, an EPON typically employs some arbitration mechanism to avoid data collision and to provide fair sharing of the upstream fiber-channel capacity. This is achieved by allocating a transmission timeslot to each ONU. An ONU typically buffers data it receives from a subscriber until the ONU's local time reaches the start time of its transmission timeslot. When its turn arrives, the ONU "bursts" all stored frames to the OLT at full channel speed.

One issue in designing an EPON is the interference with data transmission caused by laser noise from different ONUs. A laser transmitter within an ONU generates spontaneous emission noise, even in the absence of data transmission. Hence, if an ONU's laser remains on between transmission timeslots, its spontaneous emission noise may impair the signal quality of data transmitted by another ONU. This impairment worsens when the noise from multiple closely-located ONUs interferes with the data signal from a distant ONU.

One can avoid the laser-noise problem by turning off a laser when it is not transmitting data. This can be accomplished by using a laser-control signal, which is generated in the data link layer and received in the physical layer.

However, sending a control signal across several sublayers violates a basic layering principle, which is, a layer or a sublayer may only signal its immediate neighboring layers or sublayers. Note that in an ONU, the data link layer includes a medium access control (MAC) client sublayer, a multi-point MAC control sublayer, and a MAC sublayer. Furthermore, the physical layer includes a reconciliation sublayer, a Gigabit media independent interface (GMII), a physical coding sublayer (PCS), a physical medium attachment (PMA) sublayer, and a physical medium dependent (PMD) sublayer. In this environment, a laser-control signal is typically generated by the MAC control sublayer and is received by the PMD sublayer, thereby bypassing the sublayers between the MAC control sublayer and the PMD sublayer.

Hence, what is needed is a method and an apparatus for efficiently controlling laser transmission for an ONU without sending a control signal across multiple sublayers.

SUMMARY

One embodiment of the present invention provides a system that facilitates transmission control in an Ethernet passive optical network, which includes a central node and at least one remote node, and wherein a remote node implements a data-link layer and a physical layer. During operation, the system starts by receiving, at the physical layer of a remote node, a word which is communicated from the data-link layer of the remote node, wherein the word may be a data word or an idle word. The system then delays the word for a pre-determined amount of time before allowing the word to be transmitted by a transmitter, thereby providing time for turning the transmitter on or off. The system also turns the transmitter on or off based on the content of the received words.

In a variation of this embodiment, turning the transmitter on or off based on the content of the received words involves turning on the transmitter if the transmitter is currently powered off and if the received word is a data word.

In a variation of this embodiment, turning the transmitter on or off based on the content of the received words involves turning off the transmitter if the transmitter is currently powered on and if the number of consecutive received idle words is equal to or greater than a pre-determined number.

In a variation of this embodiment, delaying the word for a pre-determined amount of time involves: buffering the word in a first-in-first-out (FIFO) queue; shifting each word buffered in the FIFO queue towards the head of the FIFO queue at regular time intervals; and removing a word at the head of the FIFO queue at regular time intervals.

In a variation of this embodiment, the system determines the amount of time for which the word is delayed based on a laser turn-on time, an automatic gain control (AGC) time, and a data and clock recovery (CDR) time.

In a variation of this embodiment, if the received word is a data word, the system temporarily prohibits the data link layer from sending another data frame immediately after the current data frame which is being received at the physical layer, thereby allowing a sufficient number of idle words to be inserted between data frames.

In a variation of this embodiment, if there are a sufficient number of consecutive idle words received at the physical layer, the system allows the data link layer to send another data frame to the physical layer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs).

Passive Optical Network Topology

Figure 1:
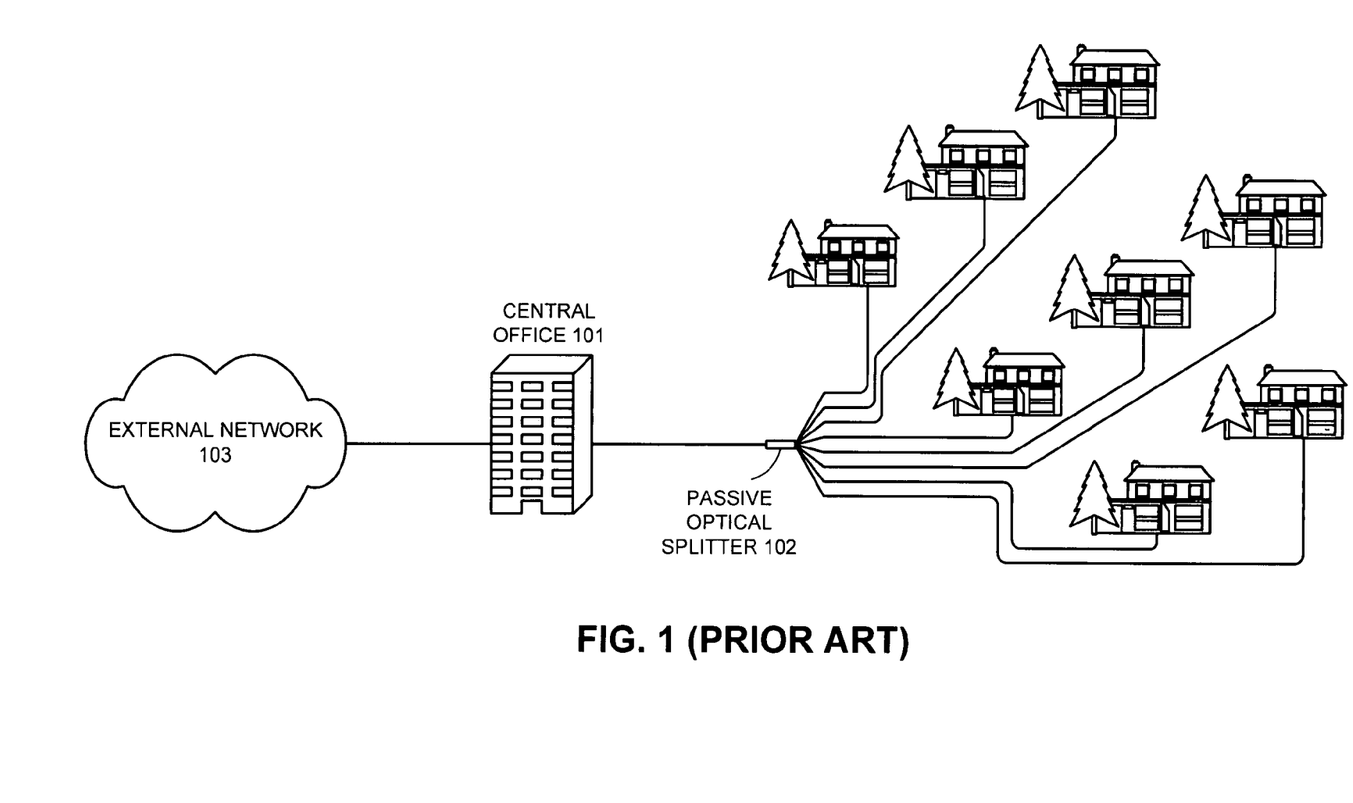
FIG. 1 illustrates an Ethernet passive optical network wherein a central office and a number of subscribers are coupled through optical fibers and a passive optical splitter (prior art).

FIG. 1 illustrates a passive optical network, wherein a central office and a number of subscribers are coupled together through optical fibers and a passive optical splitter (prior art). As shown in FIG. 1, a number of subscribers are coupled to a central office 101 through optical fibers and a passive optical splitter 102. Passive optical splitter 102 can be placed in the vicinity of end-user locations, so that the initial fiber-deployment cost is minimized. Central office 101 can be coupled to an external network 103, such as a metropolitan area network operated by an Internet service provider (ISP). Note that although FIG. 1 illustrates a tree topology, a passive optical network can also be based on other topologies, such as a ring or a bus.

Normal Operation Mode in EPON

FIG. 2 illustrates an EPON in normal operation mode (prior art). To allow ONUs to join an EPON at arbitrary times, an EPON typically has two modes of operation: a normal operation mode and a discovery (initialization) mode. Normal operation mode involves regular upstream data transmissions, and allows an OLT to assign transmission opportunities to all initialized ONUs.

As shown in FIG. 2, in the downstream direction, OLT 201 broadcasts downstream data to ONU 211, ONU 212, and ONU 213. While all ONUs may receive the same copy of data, each ONU selectively forwards only the data destined to itself to its corresponding users, which are user 221, user 222, and user 223, respectively.

In the upstream direction, OLT 201 first schedules and assigns transmission timeslots to each ONU according to the ONU's service-level agreement. When not in its transmission timeslot, an ONU typically buffers the data received from its user. When its scheduled transmission timeslot arrives, an ONU transmits the buffered user data within the assigned transmission timeslot.

Figure 3:
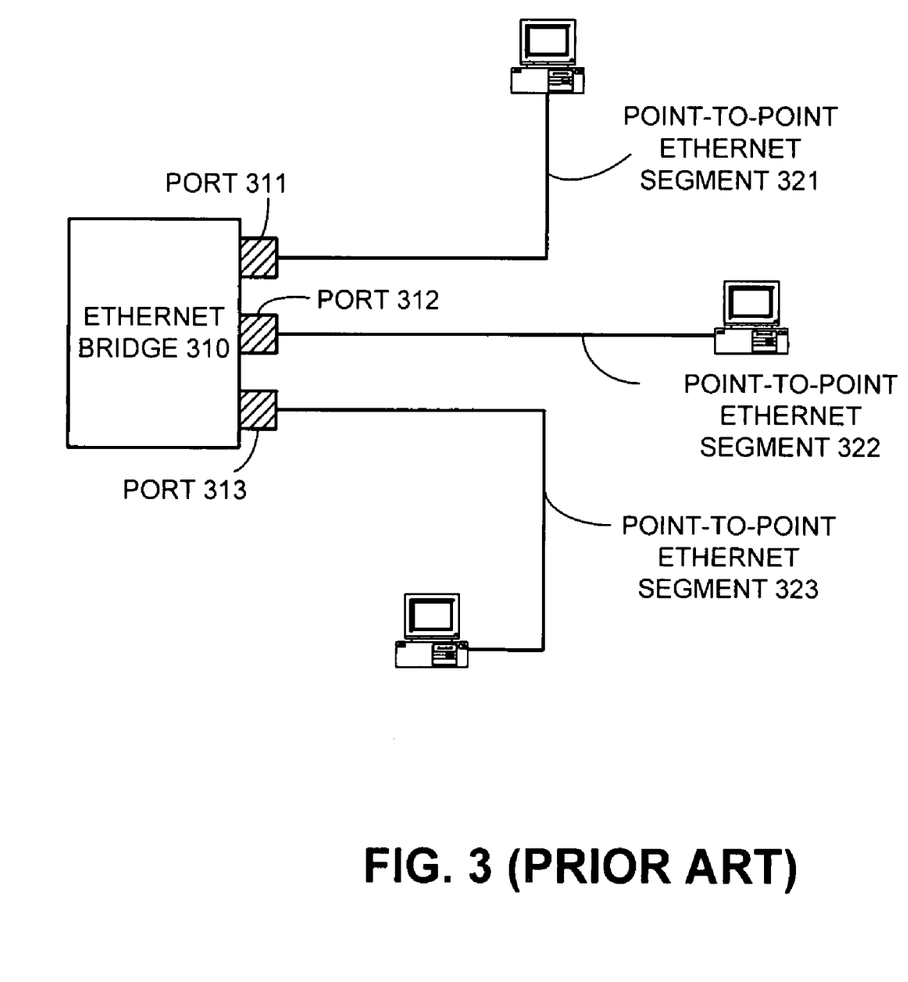
FIG. 3 illustrates bridged Ethernet segments (prior art).

Since every ONU takes turns in transmitting upstream data according to the OLT's scheduling, the upstream link's capacity can be efficiently utilized. However, for the scheduling to function properly, the OLT needs to discover and initialize a newly joined ONU. During discovery, the OLT may collect information critical to transmission scheduling, such as the ONU's round-trip time (RTT), its media access control (MAC) address, its service-level agreement, etc. (Note that in some cases service-level agreement may already be known to the OLT), General Ethernet Requirement FIG. 3 illustrates bridged Ethernet segments (prior art). The IEEE 802 standards allow an Ethernet segment to operate in a point-to-point mode. In a point-to-point Ethernet segment, a link couples two hosts, or a host and an Ethernet bridge. Point-to-point mode is a common form of operation in a switched Ethernet, such as Gigabit Ethernet.

When multiple Ethernet hosts need to communicate with each other, an Ethernet bridge typically couples and switches between multiple point-to-point Ethernet segments to allow inter-segment communications. As shown in FIG. 3, Ethernet bridge 310 has multiple ports. Point-to-point segments 321, 322, and 323 are coupled to ports 311, 312, and 313, respectively. If the host on segment 322 sends a data frame to the host on segment 321, the data frame will be forwarded by Ethernet bridge 310 from port 312 to port 311 according to its destination Ethernet (MAC) address. Generally, a bridge does not forward a frame back to the port on which it arrives.

Point-to-Point Emulation (PtPE) in EPON

In an EPON, because the upstream transmission from an ONU to the OLT is point-to-point communication, the operation of EPON ideally conforms to the point-to-point Ethernet operation as defined by the IEEE 802 standards. However, the EPON architecture does not automatically satisfy the requirement of bridged point-to-point Ethernet: if the EPON upstream link is coupled to one Ethernet bridge port, and all the upstream traffic is received at that port, users connected to different ONUs on the same EPON will be unable to communicate with each other. The Ethernet bridge located within the OLT will not switch among the upstream data, because they are received on the same port. Such a configuration forces data traffic among ONUs within the same EPON to be processed on layer 3 (network layer) and switched by equipment that resides outside the EPON (e.g., an IP router to which the OLT is connected). This is a very inefficient way of delivering intra-EPON traffic.

To resolve this problem, and to ensure seamless integration of an EPON with other Ethernet networks, devices attached to the EPON medium ideally have an additional sublayer that can emulate a point-to-point medium. This sublayer is referred to as the reconciliation sublayer (RS), and resides below the data link layer to preserve existing Ethernet MAC operation defined in the IEEE 802.3 standards. Operation of RS relies on tagging Ethernet frames with tags unique for each ONU. These tags are called logic link IDs (LLIDs) and are placed in the preamble before each frame.

Figure 4A:
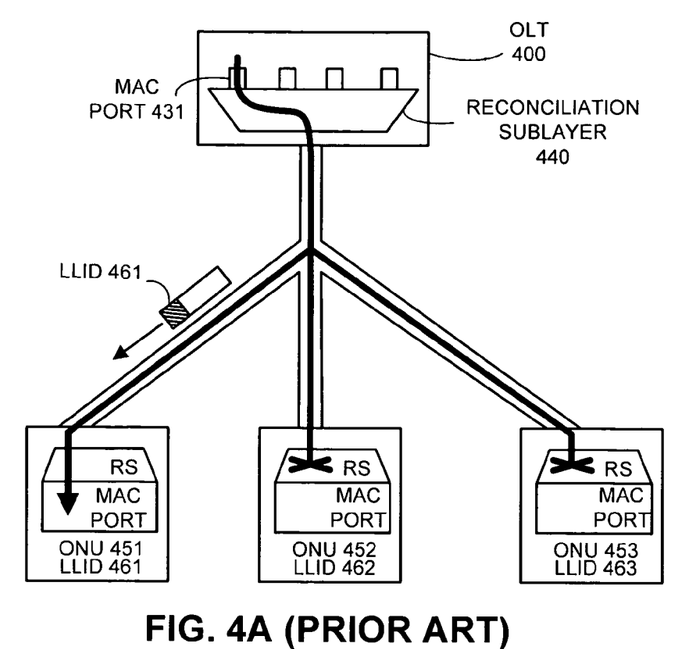
FIG. 4A illustrates transmission of downstream traffic with point-to-point emulation in an EPON (prior art).

FIG. 4A illustrates transmission of downstream traffic with point-to-point emulation in an EPON (prior art). In PtPE mode, OLT 400 has multiple MAC ports (interfaces), each of which corresponds to an ONU. When sending an Ethernet frame downstream from MAC port 431, reconciliation sublayer 440 in OLT 400 inserts LLID 461 which is associated with MAC port 431. Although the frame is broadcast through the passive optical coupler to every ONU, only the reconciliation sublayer module located within an ONU with a matching LLID (ONU 451 with LLID 461 in this example) will accept the frame and pass it to its data link layer for further verification. MAC sublayers in other ONUs (ONU 452 with LLID 462, and ONU 453 with LLID 463) generally do not receive that frame. Accordingly, it appears as if the frame is sent on a point-to-point link to the destination ONU.

Figure 4B:
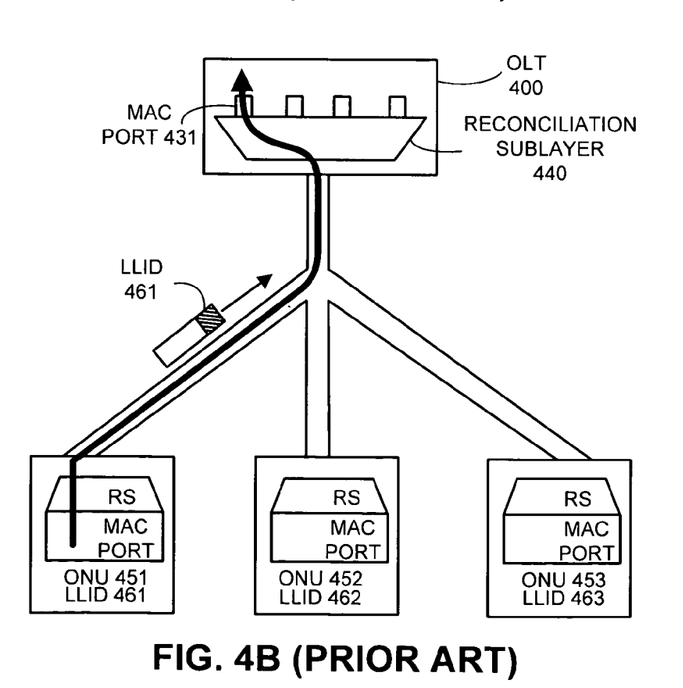
FIG. 4B illustrates transmission of upstream traffic with point-to-point emulation in an EPON (prior art).

FIG. 4B illustrates transmission of upstream traffic with point-to-point emulation in an EPON (prior art). In the upstream direction, ONU 451 inserts its assigned LLID 461 in the preamble of each transmitted frame. Accordingly, reconciliation sublayer 440 of OLT 400 disseminates the frame to MAC port 431.

Sharing of the Upstream Link Among Multiple ONUs

In an EPON, multiple ONUs typically share one uplink for transmitting upstream data, because there is only one link between the optical splitter and the OLT. To coordinate this time-shared transmission, the OLT assigns transmission timeslots to each ONU. One issue in implementing such a time-shared transmission scheme is the interference with data transmitted from one ONU caused by laser noise from other ONUs.

A laser transmitter, when powered on, generates spontaneous emission noise even in the absence of data transmission. If the laser transmitter of an ONU is not turned off when it is not transmitting data, the accumulated noise from multiple ONUs may interfere with the data transmission of another ONU. This interference may worsen if the noise-generating ONUs are closer to the optical splitter than the data-transmitting ONU is.

Figure 5A:
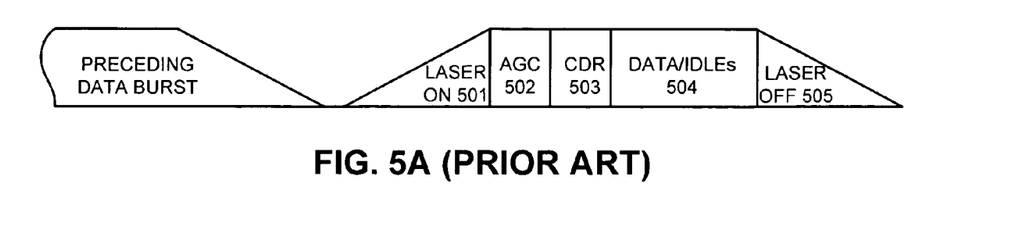
FIG. 5A illustrates the structure of a transmission timeslot in an EPON (prior art).

One approach to solve this interference problem is to turn off a laser between transmission slots. FIG. 5A illustrates the structure of a transmission timeslot in an EPON (prior art). An upstream data burst contained in a transmission timeslot comprises several parts beside its data payload. As shown in FIG. 5A, a timeslot may contain a laser turn-on period 501, an automatic gain control (AGC) period 502, a clock and data recovery (CDR) period 503, a data/idle payload 504, and a laser turn-off period 505. Note that, because a laser generally does not turn on or off instantaneously, the laser response time should be accounted for when calculating the right moment to turn on or turn off a laser with regard to the assigned timeslot.

Figure 5B:
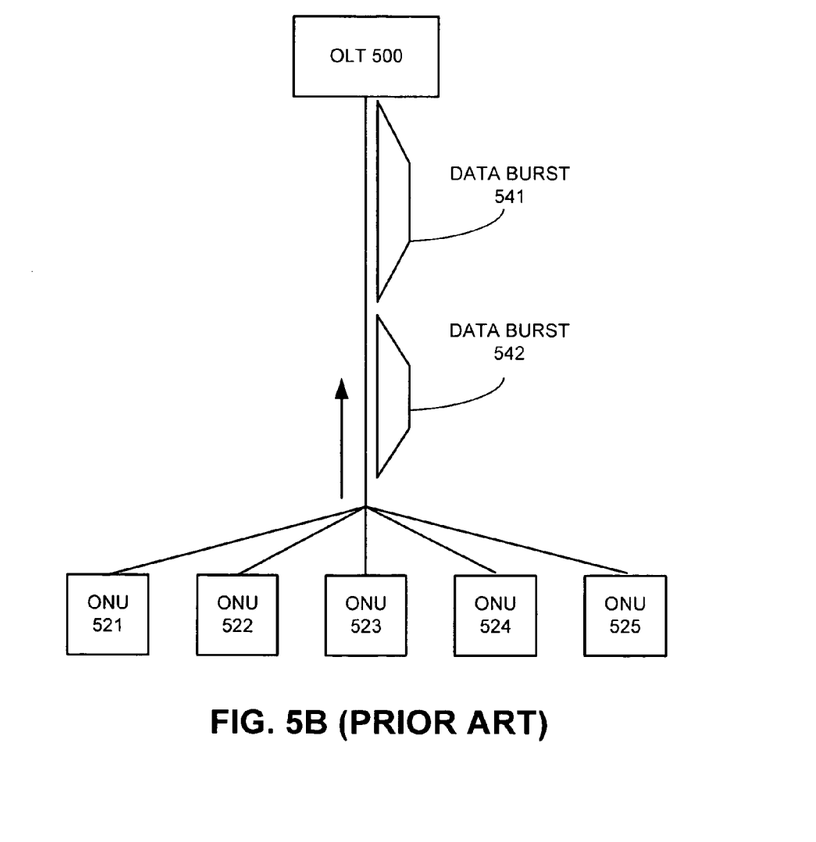
FIG. 5B illustrates the transmission of upstream data bursts from multiple ONUs (prior art).

FIG. 5B illustrates the transmission of upstream data bursts from multiple ONUs (prior art). As shown in FIG. 5B, five ONUs 521-525 communicate with OLT 500. Upstream data bursts 541 and 542, transmitted by ONUs 521 and 522 respectively, share the same uplink. The lasers within ONUs 522-525 are turned off when ONU 521 is transmitting data burst 541. After completing data transmission, ONU 521 turns off its laser to allow ONU 522 to transmit data burst 542.

ONU Transmission Control

To turn on a laser when the assigned timeslot arrives and to turn off the laser when the transmission is complete, one may simply generate a laser on/off control signal from the data link layer to control the laser which belongs to the physical layer. This is because an ONU's local clock typically resides in the data link layer, based on the IEEE 802.3 ah standards, and hence it is suitable for the data link layer to detect the beginning and the end of a transmission timeslot. However, this approach violates a basic layering principle, which is, a layer or a sublayer may only signal its immediate neighboring layers or sublayers.

Figure 6:
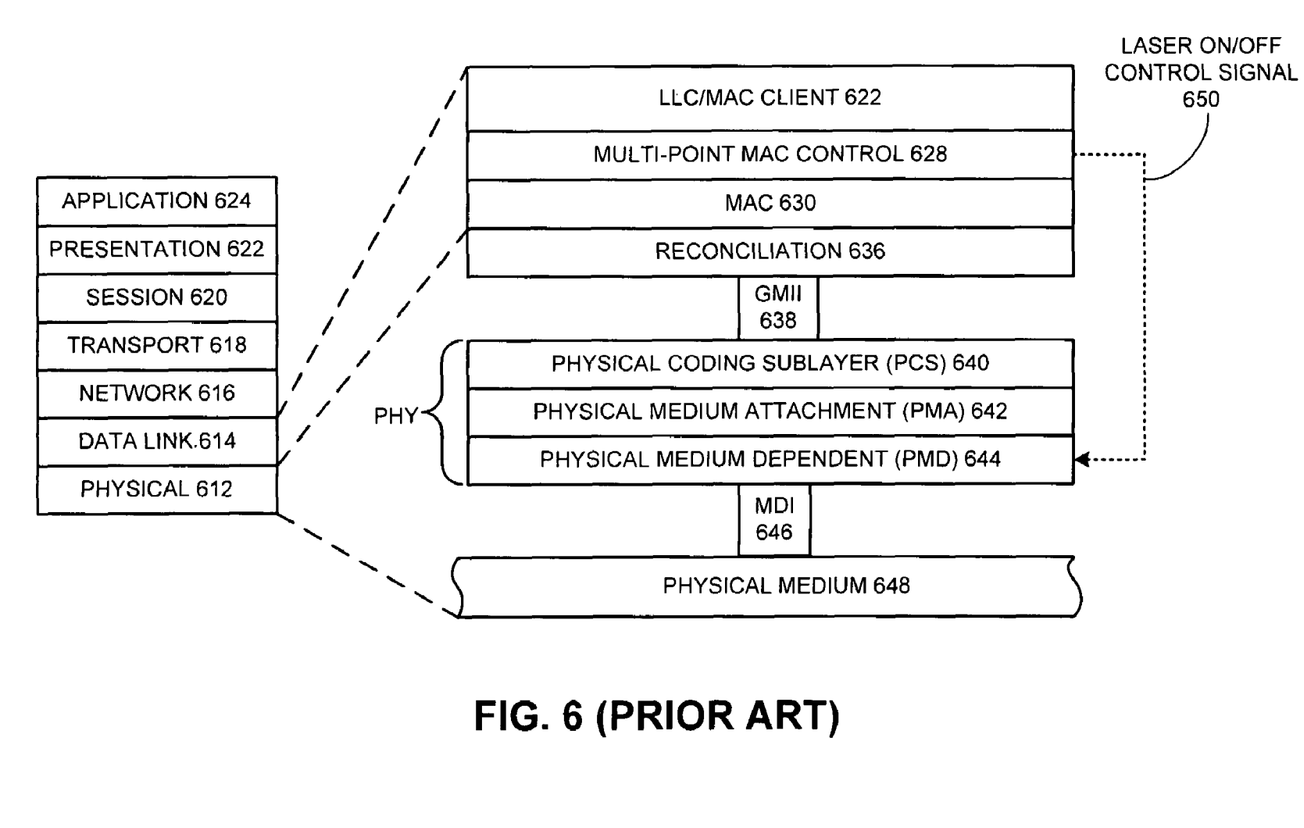
FIG. 6 illustrates generating a laser control signal from the data link layer to control a laser which belongs to the physical layer (prior art).

FIG. 6 illustrates generating a laser control signal from the data link layer to control a laser which belongs to the physical layer (prior art). As shown in FIG. 6, the OSI model layers comprise a physical layer 612, a data link layer 614, a network layer 616, a transport layer 618, a session layer 620, a presentation layer 622, and an application layer 624. EPON equipment mainly operates within physical layer 612 and data link layer 614. Based on the IEEE 802.3 standards, data link layer 614 in an EPON includes an LLC/MAC client sublayer 622, a multi-point MAC control sublayer 628, and a MAC sublayer 630; and the physical layer includes a reconciliation sublayer 636, a GMII interface 638, a PCS sublayer 640, a PMA sublayer 642, a PMD sublayer 644, a medium dependent interface (MDI) 646, and the physical medium 648 (optical fiber). In particular, a physical-layer device (PHY) generally implements the PCS, PMA, and PMD sublayers.

A laser on/off control signal 650 is typically generated at multi-point MAC control sublayer 628 and sent to PMD sublayer 644 to turn on or turn off the laser. Such a signaling mechanism, although simple, violates the layering principle that in general a sublayer may not signal across multiple layers/sublayers. One way to avoid this layering violation is to eliminate laser control signal 650 which travels across multiple sublayers.

One embodiment of the present invention introduces a pre-determined amount of delay for every word received from the data link layer at the physical layer. In this way, the physical layer can determine, by observing the words which are delayed, when there is data to be transmitted, and can have enough time to turn on the laser and to prepare for the data transmission. Similarly, the physical layer can determine when there is no more data to be transmitted, and can turn off the laser correspondingly. To implement the delay mechanism described above, one may use a first-in-first-out (FIFO) queue to buffer each word.

Figure 7:
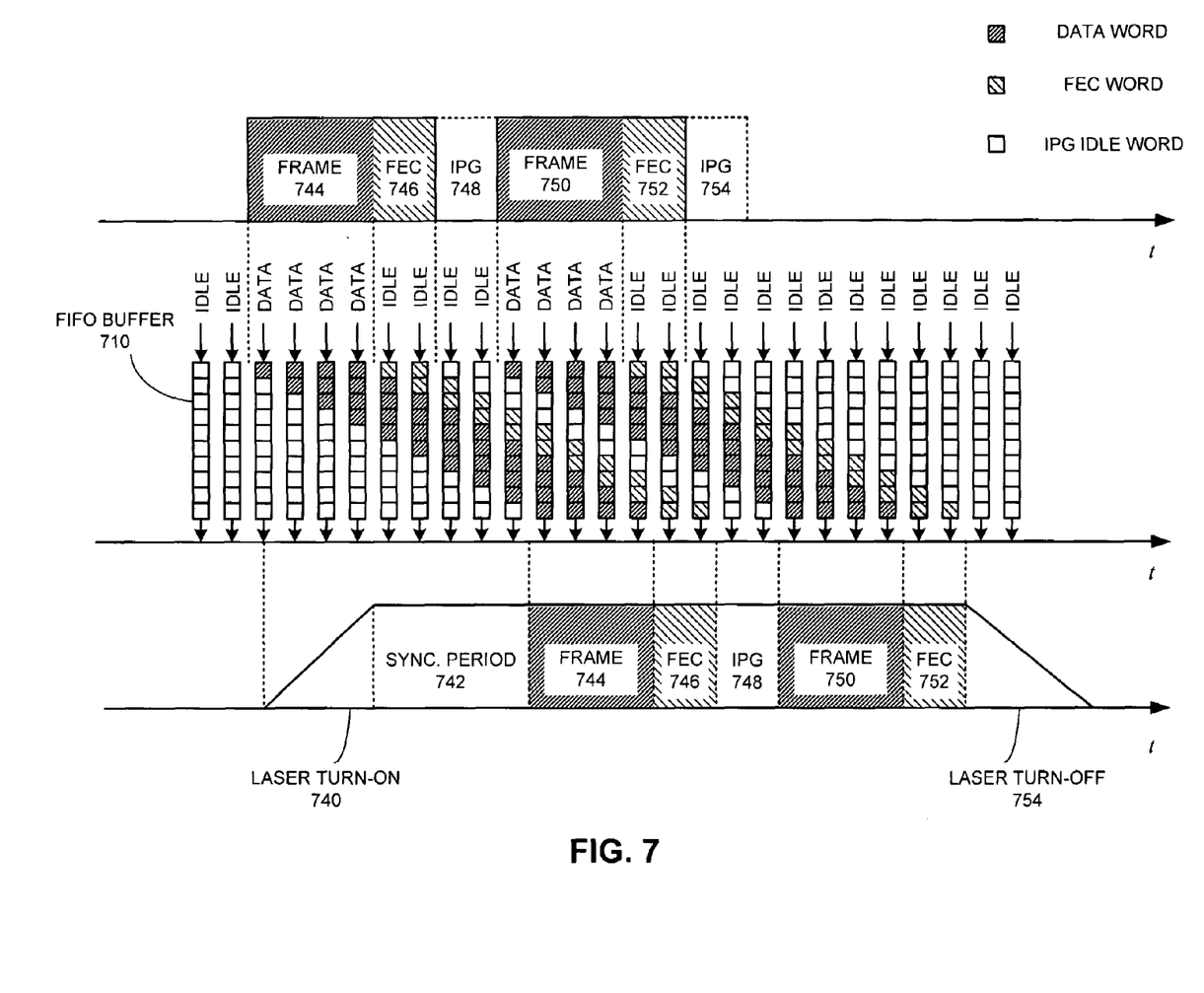
FIG. 7 illustrates the process of controlling a laser transmitter based on buffered words received from the data link layer in accordance with one embodiment of the present invention.

FIG. 7 illustrates the process of controlling a laser transmitter based on buffered words received from the data link layer in accordance with one embodiment of the present invention. As shown on the top of FIG. 7, the data received from the data link layer include data frames 744 and 750. Following frame 744 is the space for optional forward error correction (FEC) parity bits 746 and inter-packet gap (IPG) 748. Similarly, following frame 750 is the optional FEC space 752 and IPG space 754. Note that an FEC encoder may be implemented before or after the FIFO queue. Hence, FEC spaces 746 and 752 may contain FEC parity data for the preceding frame (if FEC encoding is implemented before the FIFO queue), or idles (if FEC encoding is implemented after the FIFO queue).

Typically, the length of an FEC space is a function of the preceding frame's length. In the illustrated example, FEC space 746 depends on the length of frame 744, and FEC space 752 depends on the length of frame 750. In addition, there is a minimum required size for IPG. For example, the IEEE 802.3ah standards define IPG to be 12-word long. FEC, on the other hand, is optional.

When words arrive at the physical layer, they are stored in a FIFO buffer 710 which has a pre-determined delay. Each word, after being stored at the tail of FIFO buffer 710, shifts towards the head of FIFO buffer 710 at regular time intervals.

To determine when to turn on or turn off the laser, the system ideally monitors the content of the received words. When a received word is a data word and the laser is currently powered off, the system turns on the laser. The received word is then stored in FIFO buffer 710. The total delay introduced by FIFO buffer 710, when combined with other delays introduced in the physical layer, is ideally sufficient to accommodate laser turn-on period 740 and synchronization period 742. Note that synchronization period 742 may include an automatic gain control (AGC) period and a clock and data recovery (CDR) period, which allow the OLT to prepare for reception of the upstream data.

FEC space 746 following frame 744 accommodates FEC parity bits for frame 744. Because FEC encoding may be implemented before or after the FIFO queue, FEC space 746 as received from the data link layer may contain encoded FEC parity data or may contain only idles. After FEC space 746, IPG space 748 ensures that there is a minimum gap between frame 744 (including the corresponding FEC space 768) and the subsequent frame 752. In the example shown in FIG. 7, IPG space 748 is shorter than the sum of laser turn-on period 740 and synchronization period 742. Therefore, the system does not turn off the laser during the period corresponding to IPG space 748.

Similarly, frame 750, its corresponding FEC space 752, and IPG space 754 are stored in FIFO buffer 710 when they arrive at the physical layer. The system only turns off the laser when the physical layer has received a sufficiently large number of consecutive IPG idle words. The minimum number of consecutive IPG idle words required for turning off the laser is ideally sufficient to accommodate the laser turn-on period 740 and/or synchronization period 742, in order to allow enough time for the laser to be turned on when a data word follows these idle words.

In one embodiment of the present invention, the system may require FIFO buffer 710 to contain only IPG idle words to turn off the laser. In this way, one can ensure that there is sufficient time to turn on the laser and to provide synchronization time for the next data word. As shown in FIG. 7, FIFO buffer 710 contains only IPG idle words after the last word within FEC space 752 leaves FIFO buffer 710. At this moment, the system turns off the laser, which completely shuts off after laser turn-off period 754. Note that, if FEC is not used, the system may turn off laser as soon as FIFO buffer 710 contains only IPG idle words after the last data word of frame 750 leaves FIFO buffer 710.

In some cases where an ONU resides close to the OLT, the OLT may need less than the default AGC and CDR time for synchronization. Correspondingly, the system in such an ONU may shorten the delay introduced by FIFO buffer 710 to reflect the reduced synchronization period and to reduce transmission overhead. In general, the system may re-configure the delay of FIFO buffer 710 for more flexibility.

It is important that the correct amount of FEC space and IPG space be reserved between two consecutive data frames. The reservation of FEC space and IPG space may be accomplished in the data link layer or in the physical layer. In the first scenario, the data link layer (e.g., the multi-point MAC control sublayer) is responsible for detecting data frame boundaries and inserting necessary space for FEC parity data and IPG. Correspondingly, the transmission-control mechanism in the physical layer does not need to signal the data link layer as to when to transmit a data frame and when to pause transmission.

In the second scenario, the data link layer is not responsible for inserting space for FEC and IPG between data frames. Instead, the physical layer is responsible for detecting data frame boundaries and inserting necessary space for FEC and IPG. Correspondingly, the physical layer ideally signals the data link layer as to when to transmit a data frame and when to pause transmission.

Figure 8A:
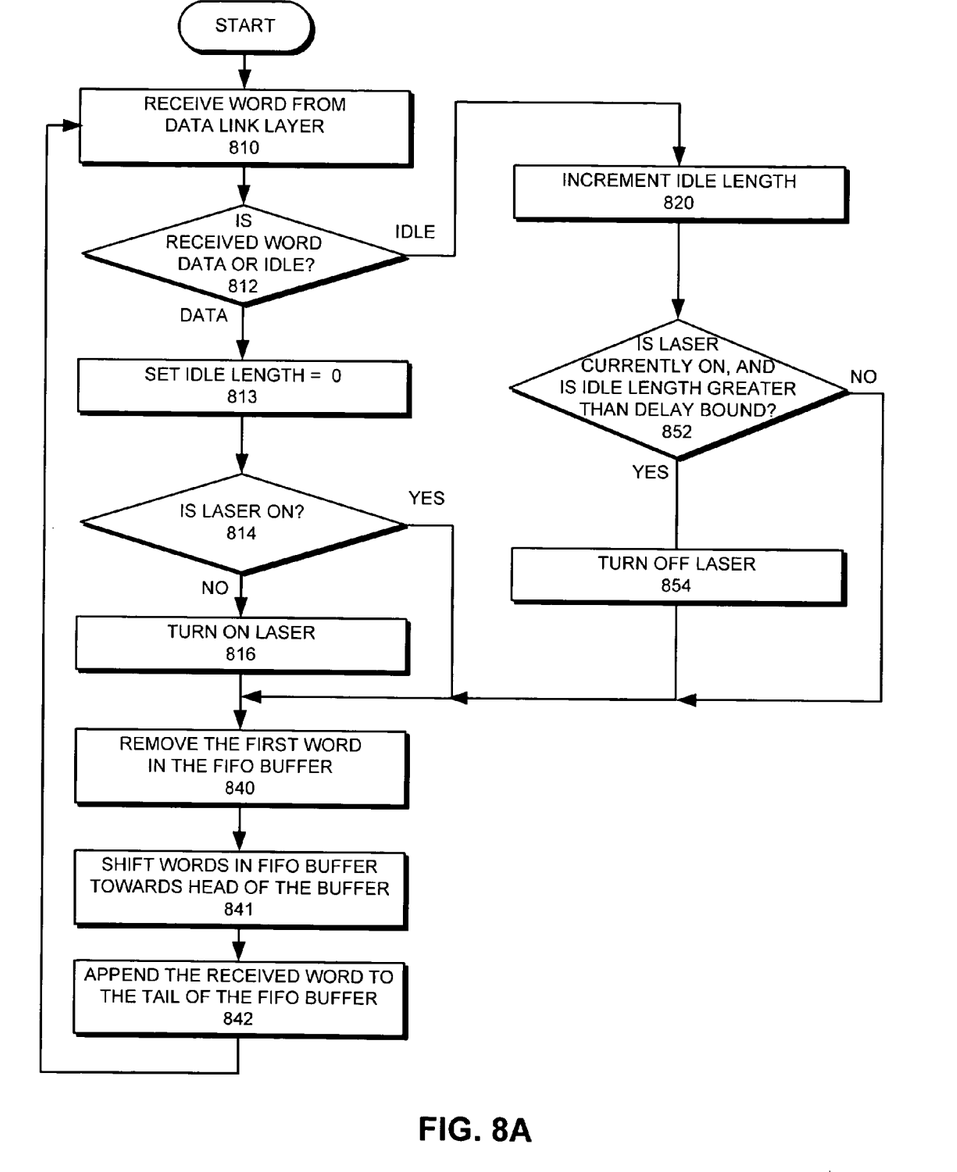
FIG. 8A presents a flow chart illustrating the process of buffering words received from the data link layer without signaling the data link layer for frame-gap control in accordance with one embodiment of the present invention.

FIG. 8A presents a flow chart illustrating the process of buffering words received from the data link layer without signaling the data link layer for frame-gap control in accordance with one embodiment of the present invention. The system starts by receiving a word from the data link layer (step 810). The system then determines whether the received word is a data word or an idle word (step 812).

If the received word is a data word, the system sets an idle length counter to 0 (step 813). Idle length represents the number of consecutive idles and is used in determining whether the laser should be turned off. The system then determines whether the laser is on (step 814). If the laser is off, the system turns on the laser (step 816). Otherwise, the system proceeds directly to remove the first word in the FIFO buffer (step 840). Next, the system shifts the words in the FIFO buffer towards the head of the buffer (step 841), and appends the received data word to the tail of the FIFO buffer (step 842). The system then prepares to receive the next word from the data link layer (step 810).

If the received word is an idle word, the system first increments the idle length counter by 1 (step 820). Next, the system determines whether the laser is currently on, and whether the idle length is greater than a delay bound, which is defined as the sum of laser turn-on period and the synchronization time (step 852). If both conditions are true, the system turns off the laser (step 854), and removes the first word in the FIFO buffer (step 840). Otherwise, the system does not change the current state of the laser, and directly proceeds to remove the first word in the FIFO buffer (step 840).

Figure 8B:
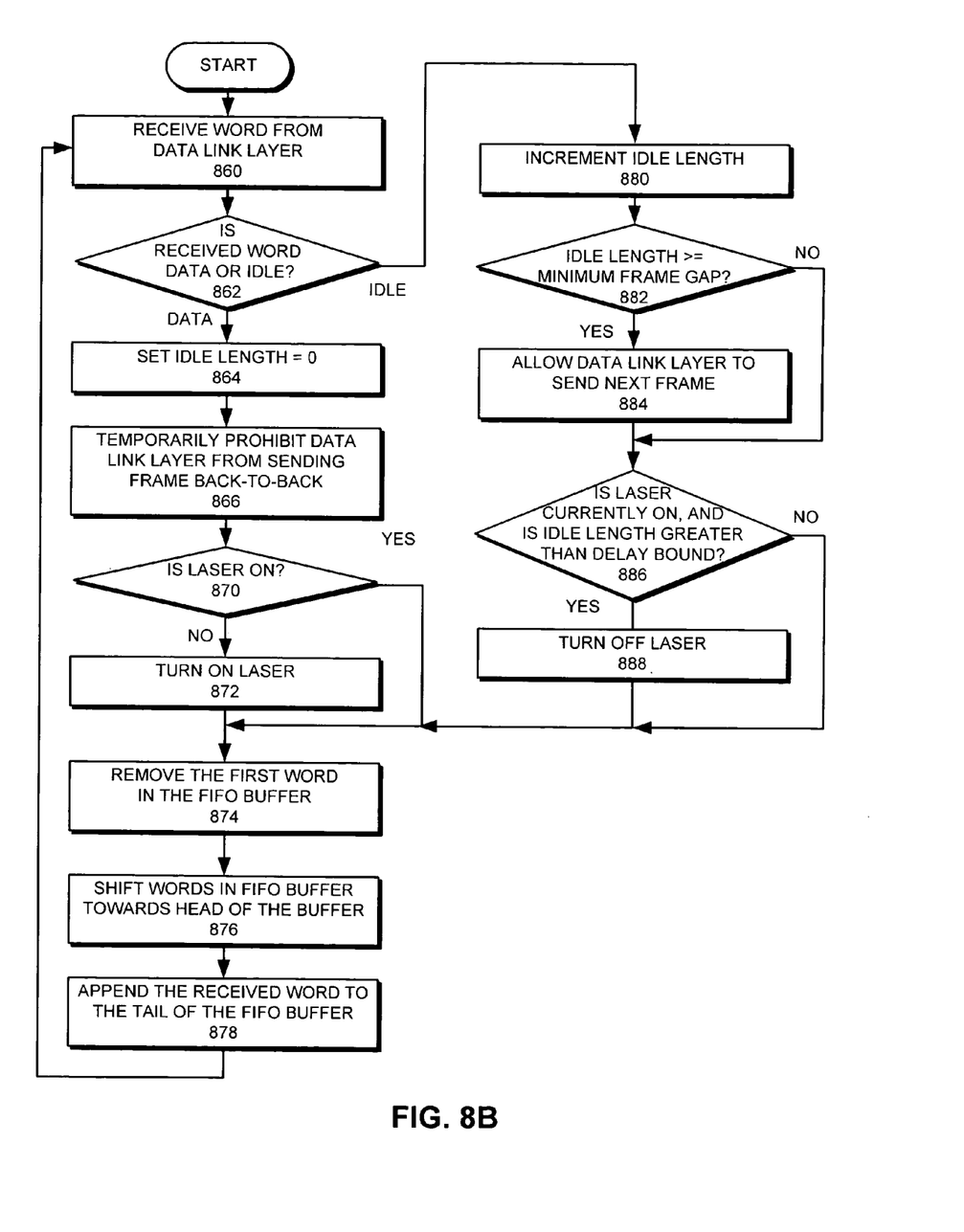
FIG. 8B presents a flow chart illustrating the process of buffering words received from the data link layer with signaling the data link layer for frame-gap control in accordance with one embodiment of the present invention.

FIG. 8B presents a flow chart illustrating the process of buffering words received from the data link layer and signaling the data link layer for frame-gap control in accordance with one embodiment of the present invention. The system starts by receiving a word from the data link layer (step 860). The system then determines whether the received word is a data word or an idle word (step 862).

If the received word is a data word, the system sets an idle length counter to 0 (step 864), and temporarily prohibits the data link layer from sending a back-to-back frame immediately after the current frame which is being received (step 866). (This may be achieved by setting a carrier-sense signal to "true," based on the IEEE 802.3 standards. This carrier-sense signal, when set to "true," allows the current data frame to finish transmission from the data link layer, and prevents the data link layer from sending the next data frame.) The system then determines whether the laser is on (step 870). If the laser is off, the system turns on the laser (step 872). Otherwise, the system removes the first word at the head of the FIFO buffer (step 874). Next, the system shifts the words in the FIFO buffer towards the head of the buffer (step 876), and appends the received data word to the tail of the FIFO buffer (step 878). The system then prepares to receive the next word from the data link layer (step 860).

If the received word is an idle word, the system first increments the idle length counter by 1 (step 880). The system then determines whether the number of consecutive idle words (idle length) is equal to or greater than a minimum frame gap (step 882). (Note that the minimum frame gap ideally includes the space for FEC parity bits (if FEC is used) and the default IPG space.) If so, the system allows the data link layer to send the next frame (step 884). (This may be achieved by setting a carrier-sense signal to "false," based on the IEEE 802.3 standards.) Otherwise, the system determines whether the laser is currently on, and whether the idle length is greater than a delay bound, which is defined as the sum of laser turn-on period and the synchronization time (step 886). If both conditions are true, the system turns off the laser (step 888), and removes the first word in the FIFO buffer (step 874). Otherwise, the system does not change the current state of the laser, and directly proceeds to remove the first word in the FIFO buffer (step 874).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for controlling transmission in an Ethernet passive optical network (EPON) which includes an Optical Line Terminal (OLT) and at least one Optical Network Unit (ONU), wherein an ONU implements a data-link layer and a physical layer, the method comprising:

receiving, at the physical layer of an ONU, a word which is communicated from the data-link layer of the ONU, wherein the word may be a data word or an idle word;

delaying, at the physical layer in the ONU, the word for a pre-determined amount of time before allowing the word to be transmitted by a transmitter, thereby providing time for turning the transmitter on or off; and turning the transmitter at the physical layer in the ONU on or off based on the current state of the transmitter and the content of the received words without data-link layer sending a control signal across multiple sublayers to the physical layer in the ONU.

2. The method of claim 1, wherein turning the transmitter on or off based on the content of the received words involves turning on the transmitter if the transmitter is currently powered off and if the received word is a data word.

3. The method of claim 1, wherein turning the transmitter on or off based on the content of the received words involves turning off the transmitter if the transmitter is currently powered on and if the number of consecutive received idle words is equal to or greater than a pre-determined number.

4. The method of claim 1, wherein delaying the word for a pre-determined amount of time involves:

buffering the word in a first-in-first-out (FIFO) queue;

shifting each word buffered in the FIFO queue towards the head of the FIFO queue at regular time intervals; and removing a word at the head of the FIFO queue at regular time intervals.

5. The method of claim 1, further comprising determining the amount of time for which the word is delayed based on a laser turn-on time, an automatic gain control (AGC) time, and a data and clock recovery (CDR) time.

6. The method of claim 1, wherein if the received word is a data word, the method further comprises temporarily prohibiting the data link layer from sending another data frame immediately after the current data frame which is being received at the physical layer, thereby allowing a sufficient number of idle words to be inserted between data frames.

7. The method of claim 1, wherein if there are a sufficient number of consecutive idle words received at the physical layer, the method further comprises allowing the data link layer to send another data frame to the physical layer.

8. An apparatus for controlling transmission in an Ethernet passive optical network (EPON) which includes an Optical Line Terminal (OLT) and at least one Optical Network Unit (ONU), wherein an ONU implements a data-link layer and a physical layer, the apparatus comprising:

a receiving mechanism configured to receive, at the physical layer of an ONU, a word which is communicated from the data-link layer of the ONU, wherein the word may be a data word or an idle word;

a delay mechanism configured to delay, at the physical layer in the ONU, the word for a pre-determined amount of time before allowing the word to be transmitted by a transmitter, thereby providing time for turning the transmitter on or off; and a control mechanism configured to turn the transmitter at the physical layer in the ONU on or off based on the current state of the transmitter and content of the received words without data-link layer sending a control signal across multiple sublayers to the physical layer in the ONU.

9. The apparatus of claim 8, wherein while turning the transmitter on or off based on the content of the received words, the control mechanism is configured to turn on the transmitter if the transmitter is currently powered off and if the received word is a data word.

10. The apparatus of claim 8, wherein while turning the transmitter on or off based on the content of the received words, the control mechanism is configured to turn off the transmitter if the transmitter is currently powered on and if the number of consecutive received idle words is equal to or greater than a pre-determined number.

11. The apparatus of claim 8, wherein while delaying the word for a pre-determined amount of time, the delay mechanism is configured to:
   buffer the word in a first-in-first-out (FIFO) queue;
   shift each word buffered in the FIFO queue towards the head of the FIFO queue at regular time intervals; and
   to remove a word at the head of the FIFO queue at regular time intervals.

12. The apparatus of claim 8, wherein the delay mechanism is further configured to determine the amount of time for which the word is delayed based on a laser turn-on time, an automatic gain control (AGC) time, and a data and clock recovery (CDR) time.

13. The apparatus of claim 8, wherein if the received word is a data word, the delay mechanism is further configured to temporarily prohibit the data link layer from sending another data frame immediately after the current data frame which is being received at the physical layer, thereby allowing a sufficient number of idle words to be inserted between data frames.

14. The apparatus of claim 8, wherein if there are a sufficient number of consecutive idle words received at the physical layer, the delay mechanism is further configured to allow the data link layer to send another data frame to the physical layer.

15. A computer readable medium not including signals storing a computer program that when executed by a computer causes the computer to perform a method for controlling transmission in an Optical Network Unit (ONU) in an Ethernet passive optical network (EPON), wherein the ONU implements a data-link layer and a physical layer, the method comprising:
   receiving, at the physical layer of an ONU, a word which is communicated from the data-link layer of the ONU, wherein the word may be a data word or an idle word;
   delaying the word, at the physical layer in the ONU, for a pre-determined amount of time before allowing the word to be transmitted by a transmitter, thereby providing time for turning the transmitter on or off; and
   turning the transmitter at the physical layer in the ONU on or off based on the current state of the transmitter and the content of the received words without data-link layer sending a control signal across multiple sublayers to the physical layer in the ONU.

16. The computer readable medium not including signals of claim 15, wherein turning the transmitter on or off based on the content of the received words involves turning on the transmitter if the transmitter is currently powered off and if the received word is a data word.

17. The computer readable medium not including signals of claim 15, wherein turning the transmitter on or off based on the content of the received words involves turning off the transmitter if the transmitter is currently powered on and if the number of consecutive received idle words is equal to or greater than a pre-determined number.

18. The computer readable medium not including signals of claim 15, wherein delaying the word for a pre-determined amount of time involves:
   buffering the word in a first-in-first-out (FIFO) queue;
   shifting each word buffered in the FIFO queue towards the head of the FIFO queue at regular time intervals; and
   removing a word at the head of the FIFO queue at regular time intervals.

19. The computer readable medium not including signals of claim 15, wherein the method further comprises determining the amount of time for which the word is delayed based on a laser turn-on time, an automatic gain control (AGC) time, and a data and clock recovery (CDR) time.

20. The computer readable medium not including signals of claim 15, wherein if the received word is a data word, the method further comprises temporarily prohibiting the data link layer from sending another data frame immediately after the current data frame which is being received at the physical layer, thereby allowing a sufficient number of idle words to be inserted between data frames.

21. The computer readable medium not including signals of claim 15, wherein if there are a sufficient number of consecutive idle words received at the physical layer, the method further comprises allowing the data link layer to send another data frame to the physical layer.

* * * * *